United States Patent [19]

Nelson

[11] Patent Number: 6,058,381

[45] Date of Patent: May 2, 2000

[54] MANY-TO-MANY PAYMENTS SYSTEM FOR NETWORK CONTENT MATERIALS

[76] Inventor: Theodor Holm Nelson, Kappa Building, Room 506, Keio University—SFC, 5322 Endoh, Fujisawa 252, Japan

[21] Appl. No.: 08/961,570

[22] Filed: Oct. 30, 1997

Related U.S. Application Data

[63] Continuation-in-part of application No. 08/739,947, Oct. 30, 1996, abandoned.

[51] Int. Cl.[7] ............................................ G06F 15/21
[52] U.S. Cl. ........................... 705/40; 705/26; 705/39; 705/44
[58] Field of Search ............................. 705/26, 27, 39, 705/40, 44; 380/24, 25; 395/200.3

[56] References Cited

U.S. PATENT DOCUMENTS

| | | | |
|---|---|---|---|
| 4,977,595 | 12/1990 | Ohta et al. | 380/24 |
| 4,992,940 | 2/1991 | Dworkin | 705/26 |
| 5,426,281 | 6/1995 | Abecassis | 235/379 |
| 5,511,121 | 4/1996 | Yacobi | 380/24 |
| 5,590,197 | 12/1996 | Chen et al. | 380/24 |
| 5,671,279 | 9/1997 | Elgamal | 380/23 |
| 5,677,955 | 10/1997 | Doggett et al. | 380/24 |
| 5,715,314 | 2/1998 | Payne et al. | 380/24 |
| 5,729,594 | 3/1998 | Klingman | 379/93.12 |
| 5,757,917 | 5/1998 | Rose et al. | 380/25 |
| 5,765,138 | 6/1998 | Aycock et al. | 705/7 |
| 5,794,221 | 8/1998 | Egendorf | 705/40 |
| 5,815,657 | 9/1998 | Williams et al. | 395/186 |
| 5,822,737 | 10/1998 | Ogram | 705/26 |
| 5,825,881 | 10/1998 | Colvin, Sr. | 380/24 |
| 5,826,241 | 10/1998 | Stein et al. | 705/26 |
| 5,845,267 | 12/1998 | Ronen | 705/40 |
| 5,848,161 | 12/1998 | Luneau et al. | 380/49 |
| 5,850,446 | 12/1998 | Berger et al. | 380/24 |

OTHER PUBLICATIONS

"Millicent: DIGITAL's Microcommerce System" (http://www.milicent.digital.com/), 8 pages.
"The Millicent protocols for electronic commerce" (http://www.millicent.digital.com/htm/papers/mcentny.htm), 9 pages.
"Millicent–specific elements for an HTTP payment protocol" (http://www.millicent.digital.com/html/specs/mcproto.htm), 7 pages.
"An HTTP protocol for payment" (http://www.millicent-.digital.com/html/specs/payproto.htm), 3 pages.
"Penny Regains Value with Unique Internet Microcommerce System" (http://www.dec.com/info/PR00RY/PR00RYSC.TXT), 3 pages.

*Primary Examiner*—Allen R. MacDonald
*Assistant Examiner*—Susanna Meinecke-Diaz
*Attorney, Agent, or Firm*—Hickman Stephens Coleman & Hughes, LLP

[57] ABSTRACT

A payment method (100) suitable for network (10) transactions in merchandise (12) between purchasers (14) and vendors (18), employing the services of guarantors (16) which issue vouchers (20) for payment. The vendors (18) offer the merchandise (12) on the network (10) as URLs (50), which optionally may include a URL address (52) separated from a URL request (56). The URL (50) or the URL address (52) initially includes the network (10) address of the guarantor (16), and the URL (50) or the URL request (56) specifies particular merchandise (12). By selecting the URL (50) the purchaser (14) is initially taken to the guarantor (16), where the voucher (20) is placed into the URL (50) or the URL request (56) and the network (10) address of the vendor (18) is placed into the URL (50) or the URL address (52). The purchaser (14) is then redirected to the vendor (18), where the voucher (20) is accepted as payment before the vendor (18) releases the merchandise (12) for communication over the network (10) to the purchaser (14). The guarantor (16) may optionally also query a database (28) to initially obtain, verify, or substitute an address of a vendor (18) on the network (10) before reformatting the URL (50).

32 Claims, 2 Drawing Sheets

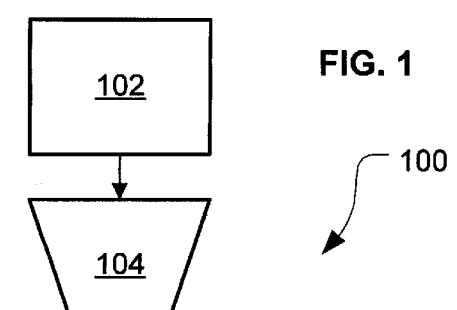
FIG. 1
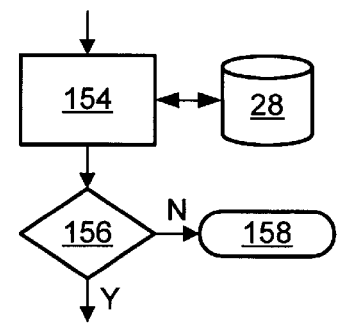
FIG. 1a
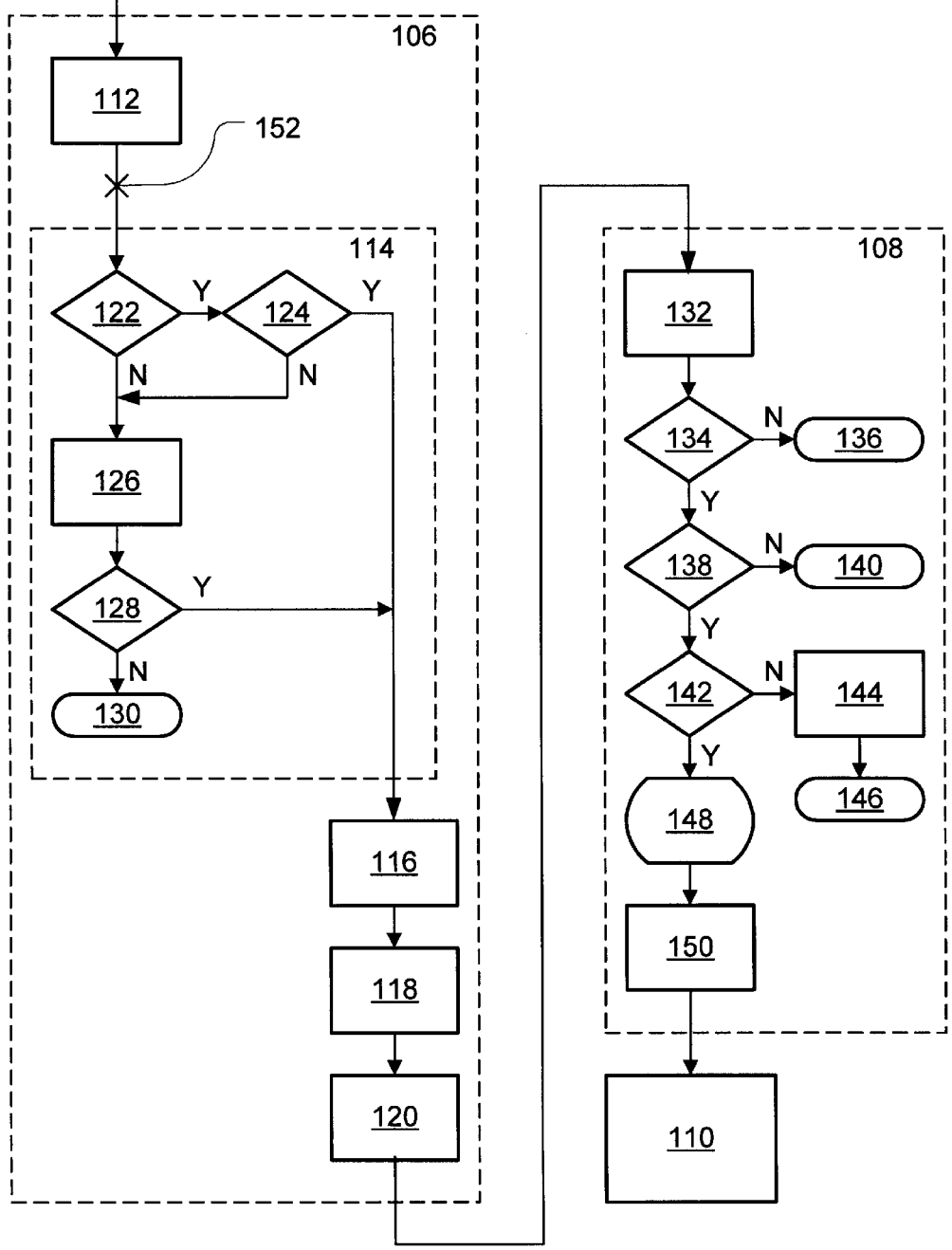

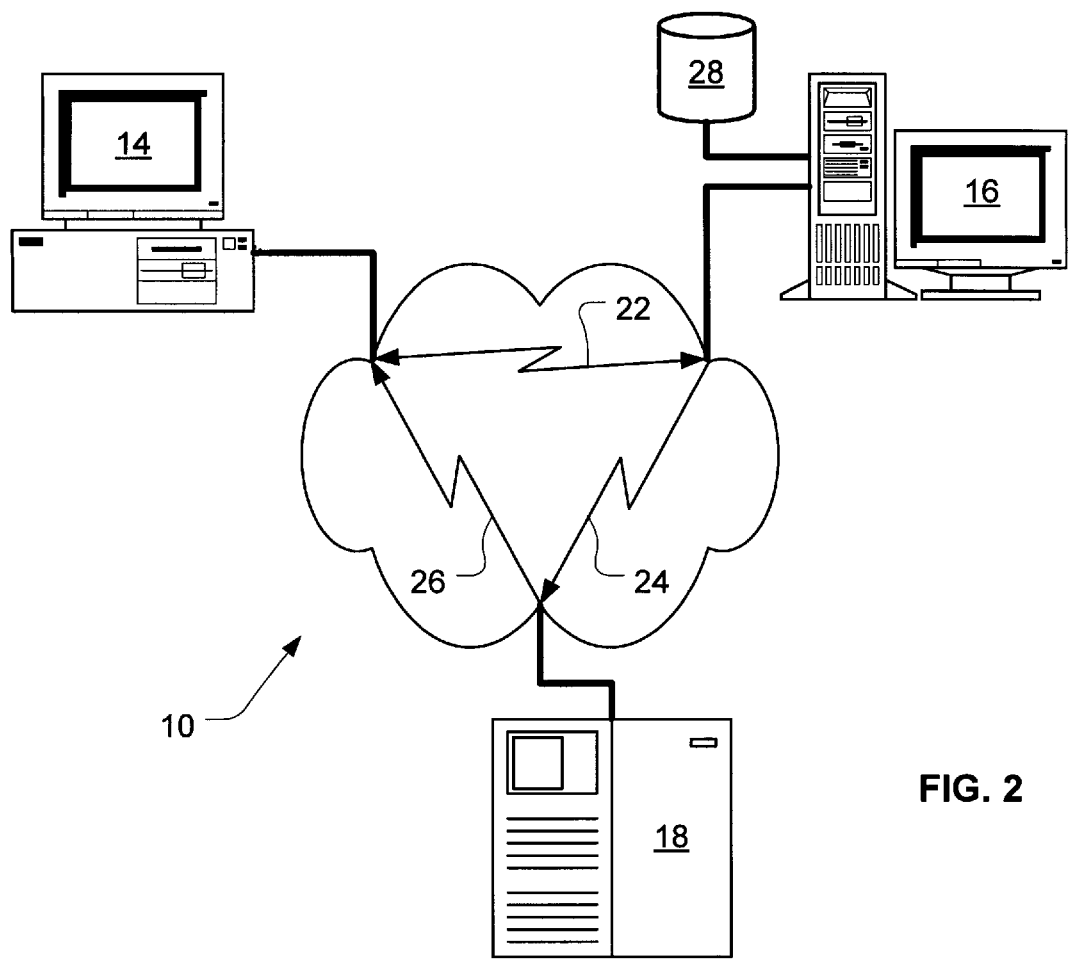
FIG. 2
FIG. 3
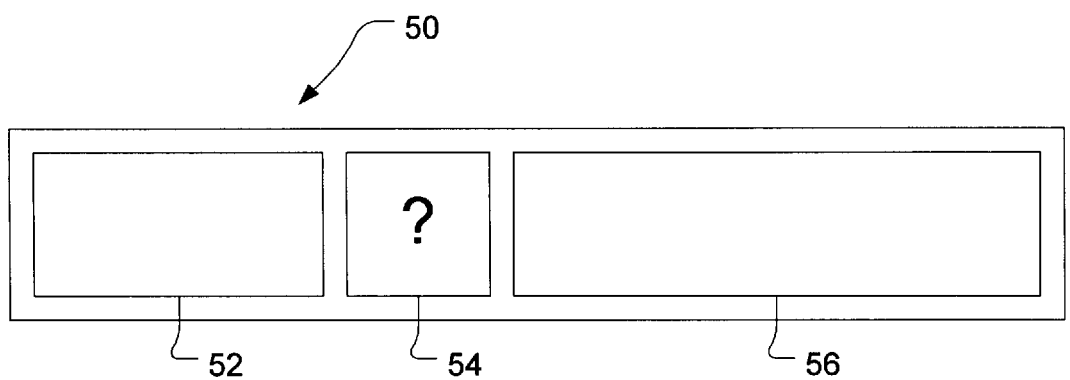

MANY-TO-MANY PAYMENTS SYSTEM FOR NETWORK CONTENT MATERIALS

CROSS-REFERENCES TO RELATED APPLICATIONS

This application is a continuation-in-part of application Ser. No. 08/739,947, filed Oct. 30, 1996, now abandoned.

TECHNICAL FIELD

The present invention relates generally to networks communications, and more particularly to automated payment transfer methods for content materials communicated via such networks. The inventor anticipates that primary application of the present invention will be for secured commerce transacted over large public networks like the Internet.

BACKGROUND ART

An issue to users and would-be users of networks, and especially largely public networks like the Internet, is how to carry out commerce in content materials which are suitable for communication across and can be made available on those networks. For example, although the World Wide Web has exhibited remarkable growth and success in recent years, it is still hampered by the lack of a satisfactory means by which some parties may sell and other parties may buy copies of content materials like text, music, still pictures, moving pictures, and potentially other materials as well. This issue becomes even more sweeping in view of the potential millions of people and businesses which may want to offer up for payment and to tender back payment for such content materials.

SUMMARY OF CONVENTIONAL WEB PAGE DELIVERY

To efficiently communicate with users today most computer systems employ visual user interfaces. Computer networks have similarly turned to the use of visual concepts, with the most common of these employing the web page. Web pages are combinations of text and tags in a coding system called Hypertext Markup Language (HTML), which are typically stored on network servers and then delivered across the networks to user's browser programs. The HTML tags serve a number of functions. Some mark portions of the text (with codes representing such elements as paragraph, font size, list item, etc., typically to control how user's browsers will format such text before it is viewed). Other HTML tags represent pieces of additional "content" to be brought into the browser and "composited" into the web pages before a user uses them.

The use of HTML tags make web pages particularly efficient by permitting the content materials which ultimately go into them to be divided up, distributively stored, easily retrieved, and assembled for ultimate user consumption as a composited web page. For example, static elements like standard text may be stored directly as text in the HTML source text, while other elements like dynamic (i.e., frequently changed) text, large elements like images, and specialized elements like music may all be stored separate from the HTML source text. These elements may merely be in stored separate files on the same server, and even in the directory as the HTML source text, or they may be stored at remote geographic locations on separate servers.

The following discussion will primarily use pictures as examples of such additional content, but it should be kept in mind that the same principles apply to other content types, and that the class of possible content types is an expanding one. The usual HTML tag for indicating that a picture is to be brought into a web page is <IMG SRC>. For example, <IMG SRC="sneard.gif"> directs a user's browser to a particular file (here named sneard.gif), which is to be brought into the composited web page as an illustration. Similarly, example of other HTML tags and content which can be used on some browsers are: <IMG DYNSRC="cheard.avi">, for movie or video type content; <BGSOUND SRC="pheard.wav">, for sound content; and <TXT SRC="queard.txt">, for text content (<TXT SRC> is in very limited use, but illustrates the extendable nature of HTML).

The interchange between the browsers which retrieve and the servers which provide web page content material is often complex, and is managed by the Hypertext Transfer Protocol (HTTP). The most common event controlled by HTTP is the following of a Uniform Resource Locator (URL also widely referred to as a Universal Resource Locator) address by the browser to an address on a server. (Uniform Resource Names (URN) and Uniform Resource Identifiers (URI) are also part of the design of the World Wide Web (WWW).) URL's are strings of text which are usually treated as a sequence of address parts, and optionally also present a request message to a server. For instance, suppose that a web page contains the URL string "http://www.sfc.keio.ac.jp/~ted/." This message tells the browser to establish a session with a server having the address "www.sfc.keio.ac.jp" (Keio University SFC campus, Japan), and to retrieve an "index.html" web page from the "public_html" directory of the user with account-name "ted" (the inventor). In this case the text "www" happens to be a common script, often used by organizations on the World Wide Web of the Internet. This script directs delivery of a default web page ("index.html") from a default directory ("public_html") which has previously been set up on this server for the specified user (Ted).

In the above example the server delivers the web page passively, without using any special scripts. However, servers may also deliver web pages more actively by running a special script program for each interchange. Today, Common Gateway Interface (CGI) scripts are widely used for this. They are a special, yet simple, kind of program which may be used externally (i.e., external from the user's browser), to arbitrarily extend the functions of a server. Such scripts commonly use the question-mark ("?") character as a separator between the URL address for a server and a question or request to that server. For example, the URL string "www.yahoo.com ? snerd" is both a URL address and implicitly also a request which should be executed when the server at that URL address is contacted. Thus, when the server "www.yahoo.com" receives this request it will attempt to look up "snerd" and to take some action, with what happens then being entirely based upon what the administrators of the www.yahoo.com server have set up their system to do if it happens to receive the information string "snerd." It should be noted that this system of delivery of network content materials is essentially a form of copying, and that no payment usually occurs in this type of scenario.

"TRANSCOPYRIGHT" CONTENT MATERIAL DISTRIBUTION PERMISSION

Transpublishing and transcopyright are concepts intended to simplify the re-use and republication of copyrighted material, so that such materials may easily be included in electronic documents. These concepts do not attempt to change the law (which would be extremely difficult) but instead provide a simple way to re-use and republish with permission, and without damaging the rights of the copyright holder.

Transpublishing means quoting from another document by arranging to have that piece delivered from the original. Since the user receives the quotation from the original they have a bridge to the original context. Any content materials participating in such a system may be re-used and republished (like clip art, boilerplate text, etc.), since the delivery and purchase of each quoted piece is always from the original, which the publisher maintains control over and may require payment or set other conditions for access to.

Transcopyright is the legal system required to make transpublishing possible. It is a form of license or permission method whereby the publisher states "I hereby give permission for this material to be used in any new context, as long as it is always delivered from my original (or some other source which I authorize)."

Transpublishing and transcopyright are not new concepts. They were first proposed by the inventor in 1960, as part of Project Xanadu, an on-line storage and publishing agency, and have been extensively written about and discussed.

PAYMENT SYSTEMS FOR NETWORK AVAILABLE CONTENT MATERIALS

Networks such as the Internet provide a remarkable channel of communication, one which is extremely low in cost but also low in security. A number of payment systems exist for networks. Some have no features of particular interest, instead being merely bookkeeping systems. Others relate differently to the new and unique problems of this venue.

There are two principal problems. One is that eavesdropping at various levels is not difficult for the technically competent, and the other is that if money is represented by some sort of symbolic string of characters or bits, i.e., a "value string", then that value string may potentially be used more than once with different vendors.

The different existing schemes for payment respond differently to these issues. Conventional charging systems like Visa and MasterCard have concentrated on setting up safe channels through which their account information may be transferred. An example of such a safe channel system is Secure Socket Layer (SSL), as currently implemented by Netscape (T/M of Netscape Communications Corporation of Mountain View, Calif.) and others.

Another current scheme is Digi-Cash, invented by David Chaum, which allows payment by anonymous passing of a value string. However, since the resulting value string may be used dishonestly to represent money more than once, this scheme includes a method of retribution, whereby dishonest transactions may be traced if the injured parties form a coalition to do so. While this system is widely respected it is also generally considered too heavy-duty for micro sized payments.

Yet another scheme is Millicent (T/M Digital Equipment Corporation of Maynard, Mass.). It should be noted that Digital Equipment Corporation presently asserts in the United States that Millicent is "patent-pending," but that the present inventor is not aware of any additional details in this regard. The Millicent system uses an HTTP based protocol for payment. Vendors contract with brokers to sell scrip (value strings, i.e., electronic currency) to potential users. The users then purchase scrip from the brokers with credit cards or other standard payment means; actually, it is proposed that users infrequently purchase broker-scrip in large denominations (say $5–10), and then more frequently use that to purchase vendor-scrip in smaller denominations (say 0.1–1¢). The brokers pay the vendors as they sell the vendor-scrip to the users. The users then spend the vendor-scrip directly on information (network communicate able content materials) by mouse clicking on URLs, so that their browser sends to the vendor a request which specifies the information desired and a unit of vendor-scrip (termed a bid). The vendor's server may ether: accept the bid as payment in full and deliver just the information; accept the bid as payment in full plus some excess, and deliver both the information and some (presumably) smaller vendor-scrip as change; or offer to sell the information at a higher price than the bid, to which the user's browser must reply by sending more vendor-scrip if they want the information.

In the Millicent scheme the scrip is "vendor" specific, with the brokers becoming vendors for the limited purpose of vending broker-scrip and exchanging it for vendor scrip. This system prevents double spending by a simple means: the issuer (broker) of the scrip (value string) is also the redeemer. When a scrip arrives for redemption its serial number is retired, and if that same value string is presented for redemption again it is deemed to be out of circulation and redemption is refused. Unfortunately, this scheme requires a different currency for each vendor, which is an extremely unwieldy arrangement if there are to be millions of vendors.

While admittedly a major advancement, the Millicent system has its weaknesses. For example, as noted, the scrip used is necessarily vendor specific. In theory individual vendors or associations can agree to accept scrip issued by each other. However in practice, for example, individuals and business acting as vendors in Tokyo are just not going to want or even be able to form direct trust relationships with their counterparts in Stockholm. It follows that there will be nearly as many variations of vendor-scrip as there are vendors. The users must therefore deal with the problem of a plethora of broker and vendor scrip's. For example, analogizing to a non-electronic commercial setting, this is as if one could only use English pounds sterling to purchase groceries at one store, French francs at another, and U.S. dollars at yet another, but with all of these stores next-door to one another. And as if nobody else on earth but one particular store and its broker would accept Argentine pesos, presumably with the broker extracting a fee whenever a user cashes in any unused pesos. Considering that there are less than 200 countries issuing money, and that less than 20,000 entities worldwide can be said (arguably) to issue negotiable currency instruments, then the problem of potentially hundreds of thousands and even millions of vendors wishing to do so is obvious. In essence, Millicent gives vendors the ability to coin money—which the users, the brokers, and ultimately governments, at the very least as part of their police and taxation functions, must all deal with.

The Millicent system also has weaknesses in its bid-offer based transaction scenario. The users do not get to see a price tag. When they seek to purchase information from a vendor they must instead bid by sending a unit of scrip, with the vendor expected to return scrip-change along with the information to the user, if they actually expected less than the amount tendered. But what incentive does the vendor have to do this? In reality, most vendors will not give change, and this, or even just the fear of this, will provide an incentive for users to configure their browsers so that the minimum unit of scrip possible is their opening bid, forcing the vendor to counter with an offer at a specific price. This "haggling" then burdens the network with additional legs of user-vendor communications, which in turn increase the possibility of transaction failure leaving the vendor holding the last user tendered unit of scrip and the user being dissatisfied.

Still further, the browsers needed by the users of Millicent will necessarily have to be able to automatically handle considerably more than today's presently available and widely used browsers. For example, a suitable browser will have to handle the procurement, safe-keeping, dispensing, and change return of the scrip in all of its origin-variety multitudes and denominations. A desirable browser will also have to be able to automatically bid at a minimum in each particular scrip, automatically purchase at any offer price below some user set maximum (preferably many, for different types of network content materials), and still permit the user to override the preset criteria if they decide that they do want individual instances of information strongly enough.

MONEY-CARRYING METHODS

There has until recently been no method for carrying money or credit information in a user's browser. Recent proposals for "wallet" schemes can carry such financial instruments in the browser, but these have the disadvantage that they can only be used by browsers in which this feature has been implemented (e.g., Internet Explorer, version 4.0x, T/M Microsoft Corporation of Redmond, Wash.). It should also be noted that Digital Equipment's Millicent system, discussed above, stores its scrip on a user's system using just such a wallet scheme.

Another carrying method is to put the money or credit information into a "cookie" (a packet of information carried by the browser), but a cookie can only be accessed by the party that created it. Thus, such a method is suitable for reminding a guarantor of a user's credit status, but it is unsuitable for sending a value string on to a vendor, since the vendor has no access to a cookie made by the guarantor. Cookies are also discarded automatically under some circumstances, making this an unsuitable method for financial interchange unless it is used in concert with other methods.

DISCLOSURE OF INVENTION

Accordingly, it is an object of the present invention to provide a many-to-many commerce service, allowing large numbers of firms and individuals to sell and to buy network content materials without difficulty.

Another object of the invention is to provide for payment with small amounts of money in such commerce in network content materials.

Another object of the invention is to provide for existing web browsers, without modification and without additional plug-ins, to carry out commerce in network content materials.

Another object of the invention is to facilitate the sale of content material through transpublishing, allowing virtual republication on a web page by means of a tag summoning the sale of a piece from elsewhere.

And, another object of the invention is to provide a method of payment with which it is possible to deliver web pages containing network content materials from ordinary web servers, and a method of payment with which it is possible to receive such web pages from ordinary web browser programs.

Briefly, one preferred embodiment of the present invention is a method for carrying out transactions in merchandise which is available as content material on a network. A purchaser follows a URL on the network. The URLs used by the invention include a URL address, and a URL request which is separated from the URL address. The URL address includes an address for a guarantor on the network, and the URL request includes a specification of the merchandise. The guarantor receives the URL which has been followed to it and creates a voucher guaranteeing payment for purchase of the merchandise. The guarantor adds the voucher to the URL request, and replaces its own address in the URL address with that of a vendor on the network. The guarantor then redirects the purchaser to the vendor on the network, where the vendor receives the URL which has been followed to it and releases the merchandise over the network to the purchaser.

An advantage of the present invention is that the commercial environment which it provides allows potentially millions of user-purchasers and publisher-vendors to participate directly. With very little investment and effort individuals operating directly as creator-publishervendors can participate without using intermediaries to handle their merchandise.

Another advantage of the invention is that extremely small amounts of money may be charged for the network content materials, will under 1¢ per item. Thus maximizing the volume of transactions yet permitting profitable commerce.

Another advantage of the invention is that user-purchasers may use existing web browsers, without any modification or additional plug-ins. Thus they may start purchasing almost instantly, with just an easily opened account, and with no software installation required. The user-publishers may also participate very easily, with either their own server and CGI scripts, or through a service provider who offers publishing services (in many ways analogous to the way web page hosting or "farming" is available from many service providers).

Another advantage of the invention is that only three session legs are required for a complete transaction. There need be only an initial purchaser communication with a guarantor, a redirection of the purchaser by the guarantor to a vendor, and a delivery from the vendor to the purchaser.

Another advantage of the invention is that materials may be composited and republished from a variety of sources using the transpublishing and transcopyright doctrines. The sale of content material using these doctrines allows virtual republication on a web page by means of a tag for summoning the sale of a piece from elsewhere, without specific communication between the original content publisher and the quoting republisher. Thus, anyone who wants to republish transcopyrighted materials may quote them instantly, with no special arrangements, and with no special software.

Another advantage of the invention is that ordinary web pages may be offered with arbitrary prices assigned to the content materials that they may include.

Another advantage of the invention is that the user may set a purchase threshold for the maximum price of an item, avoiding accidental purchases greater than desired.

Another advantage of the invention is that a guarantor (some individual or organization with a presence on the network) simplifies the encryption and verification of symbolic value by simply guaranteeing the payment, rather than by encryption or currency specific to each vendor, and rather than by extracting actual currency payment from the purchaser before the transaction is complete.

And, another advantage of the invention is that the guarantor may also perform lookup functions during the same three session legs, such as looking up a document location by some identifying criteria (e.g., URN, URI, catalog number, etc.), rather then the purchaser having to know and provide the address of a vendor.

These and other objects and advantages of the present invention will become clear to those skilled in the art in view of the description of the best presently known mode of carrying out the invention and the industrial applicability of the preferred embodiment as described herein and as illustrated in the several figures of the drawings.

BRIEF DESCRIPTION OF THE DRAWINGS

The purposes and advantages of the present invention will be apparent from the following detailed description in conjunction with the appended drawings in which:

FIG. 1 is a flowchart of one process by which the present invention may be carried out, while FIG. 1a is an addition to FIG. 1 shown how a guarantor may also act as a lookup service;

FIG. 2 is a stylized depiction of various parties and elements used by the invention; and, FIG. 3 is a block diagram illustrating the structure of URLs in HTML tags which are usable by the invention.

BEST MODE FOR CARRYING OUT THE INVENTION

A preferred embodiment of the present invention is an automated payment transfer method for network content materials. As illustrated in the various drawings herein, and particularly in the view of FIG. 1, a form of this preferred embodiment of the invention is depicted by the general reference character 100.

FIG. 1 depicts the inventive payment method 100, FIG. 2 shows various parties and elements involved as the invention is practiced, and FIG. 3 illustrates the structure of URLs used by the invention. These figures should be referred to interchangeably to follow the discussion below.

In step 102, a network 10 is used to offer merchandise 12 (not shown, since it is intangible, but numbered here for reference) to a purchaser 14 (i.e., a user of the network 10 seeking to purchase an instance of the merchandise 12 content material), via a URL 50. In step 104, the purchaser 14 orders the merchandise 12 by following the URL 50. In step 106, a guarantor 16 receives the order for the merchandise 12, authorizes credit for the purchaser 14 to buy the merchandise 12 from a vendor 18, creates a voucher 20 (i.e., a guarantee of payment; not shown, since it is also intangible but also numbered here for reference) for payment for the merchandise 12, reformats the URL 50 to point to the vendor 18 and to include the voucher 20, and redirects the purchaser 14 to the vendor 18, via the revised URL 50. In step 108, the vendor 18 receives the order, confirms the pricing, processes the voucher 20, verifies availability, and sends the merchandise 12 to the purchaser 14. Finally, in step 110, the purchaser 14 receives the merchandise 12, applies it as desired, and carries on with other transactions with the payment method 100 as needed. In sum, the payment method 100 uses only three major legs: a purchaser 14 to guarantor 16 first leg 22, a guarantor 16 to vendor 18 second leg 24, and a vendor 18 to purchaser 14 third leg 26.

The inventor envisions that the network 10 typically will be a large publicly accessible communications medium such as the Internet, although smaller private venues may also be used. Accordingly, the merchandise 12 may be virtually any form of content material which can be suitably communicated over such networks 10. Today perhaps the most common examples of such content (i.e., suitable merchandise 12) are image files or pictures. The Internet is presently extensively used to transfer large numbers of such still picture image files, which are viewed as included elements in web pages and optionally saved and used for other purposes. Similarly, text files, moving picture image sequence files, and audio files of various types are other examples of present network content material which may be handled by the payment method 100 as merchandise 12. The merchandise 12 does not necessarily even have to be human consumable. For example, it can be files of raw statistical data which can be applied as desired, say in spreadsheets by a marketing firm purchaser 14. Still further, suitable networks 10, such as the Internet, are increasingly being used for automated data acquisition and equipment control tasks, with the digital data created therefrom potentially being yet another suitable commodity which the payment method 100 can handle as merchandise 12. And still other examples are easily conceived, such as units of software and data for execution on a Network Computer (NC).

As shown in FIG. 3, the URL 50 used by the payment method 100 includes three parts, for reference termed the URL address 52, the URL separator 54, and the URL request 56. Initially the URL address 52 is the address of the guarantor 16, and the URL request 56 is everything after the URL separator 54 (conventionally, but not necessarily, just a question-mark character, "?"). For instance, in this URL 50 example: guarantor.com ? vendor.com/images/snead.jpg price the text "guarantor.com" is the UTRL address 52, pointing to the guarantor 16 on the network 10 (alternately, in an Internet context, this might simply read "http://201.128.0.18"). The URL separator 54 is the conventional question-mark ("?"). And the URL request 56 is everything else, i.e., the text "vendor.com/images/snead.jpg price." This URL request 56 contains specification of the merchandise 12, as the text "snead.jpg" (designating an image file name in the DOS 8.3 naming convention; but the specification could just as easily have been a catalog number like "Cat#4381.4," which the guarantor 16 or the vendor 18 would understand and be able to work with). This URL request 56 also contains information to identify the vendor 18, i.e., the address "vendor.com" (note, as an option discussed below, this need not be in conventional network address format or even present at all). This URL request 56 also includes internal address information specific for the vendor 18. The text "/images/" concatenated between the address of the vendor 18 and the specification of the merchandise 12 indicates that the image merchandise 12 should be found in the directory named "images" at the address "vendor.com." Finally, the text "price" represents the asking price of the merchandise 12, presumably in some numeric currency value. As an aside, the inventor envisions that the amounts charged for most merchandise 12 will typically be quite low. Terms such as micropayment are already in use, e.g., in reference to prior art payment capabilities in systems like Millicent (T/M Digital Equipment Corporation of Maynard, Mass.). However, these terms have actually come to connote payments only as low as 0.1¢ to 1¢. To distinguish the true potential of the present invention, the inventor urges that the terms nanobucks and nano-payment are more appropriate, from "nano" which means one billionth.

The inventor prefers to include both the address of the vendor 18 and the price for the merchandise 12 within the URL request 56, as above. When the address of the vendor 18 is included, the specification of the merchandise 12 can easily be combined with it (as done above; this also is discussed further below). The presence of the price is optional, since it may be so low that may purchasers 14 will want to ignore it and always just go ahead and order the merchandise 12. But with the price at least available they may also set auto-purchase limits (which would require some browser specific modification). Further, it should be noted that the URL request 56 can contain considerable additional text as well, including other addresses and separator characters (even to the extent that those familiar with computer programming techniques might class it as recursive in nature).

Turning to the specifics of step 102 in FIG. 1, the offer of the merchandise 12, this can be carried out in various manners with the only actual requirement being that potential purchasers 14 in some manner have the necessary contents of the URL 50 communicated to them. It is envisioned that the most common manner of doing this will simply be for vendors 18 to themselves publish web pages on the network 10, which the potential purchasers 14 can then visit and use to select from a number of HTML tagged regions, each containing a URL 50 for an item of merchandise 12. It is quite easy to embed URLs 50 into web pages as such HTML tags (e.g., <IMG SRC="guarantor.com ? vendor.com/images/snead.jpg price">; e.g., <IMG DYNSRC="guarantor.com ? vendor.com/text/movie_of_snead.avi price">; etc.), for this very purpose.

Alternately, other parties, call them "middle agents" (or "editors," as some visionaries see that role expanding in virtual commerce-publishing contexts), can create web pages for entire classes of merchandise 12, which may be offered by different vendors 18. It is a simple extension of the payment method 100 to include additional information in the URL request 56 to facilitate this. For example, to permit a guarantor 16 to also handle "commission" payments based upon how many vouchers 20 it creates having specific origins, an identifier code may be embedded in the URL request 56. Or a vendor 18 can use a similar identifier to determine which of potentially many middle agents is actually generating business.

Step 104, purchaser 14 ordering, is also capable of being carried out in various manners. As noted above, it is expected that the most common scenario will simply be for the purchasers 14 to click on regions in web pages which contain the URLs 50. However, there is no reason why a purchaser 14 cannot also just directly type the complete text of a URL 50 into the address box of a browser. Notably, both of these techniques are conventional ways of "following" conventional URLs. Thus, from the perspective of the purchaser 14, practice of the inventive payment method 100 merely requires following the modified URLs 50 which the invention uses.

As shown in FIG. 1, step 106, handling of the merchandise 12 order by the guarantor 16, typically will include step 112, receiving the order for the merchandise 12; step 114, authorizing payment; step 116, creating a guarantee of payment, i.e., the voucher 20; step 118, reformatting the URL 50 to include both the address of the vendor 18 (in the URL address 52 field) and the voucher 20; and step 120, actually redirecting the purchaser 14 to the vendor 18. All of these sub-steps may be handled by CGI script parsing and processing of the contents of the URL 50 at the site of the guarantor 16.

In step 112 the guarantor 16 receives the order from the purchaser 14. This is a conventional operation, since the URL address 52 takes the purchaser 14 to the guarantor 16 when the URL 50 is followed.

In step 114 the guarantor 16 authorizes payment for the merchandise 12, or rejects the order. This can be handled in a number of ways, with the preferred one being depicted in FIG. 1.

The capability to transfer "cookies" has become a hidden and almost ubiquitous feature provided by modem communications software like servers and browsers. A cookie is stored on the system of the purchaser 14 (typically in a cookies directory controlled by the particular browser software which the purchaser 14 is using). The payment method 100 can use cookies to advantage to facilitate the authorization sub-tasks carried out by the guarantor 16, even though cookies are readable only by the party creating them.

In step 122 the guarantor 16 tests to see if the purchaser 14 already has an account cookie from that guarantor 16. If so, in step 124 that cookie is tested to see if the credit of the purchaser 14, reflected therein, is sufficient for the present transaction. If that is also so, then the credit of the purchaser 14 is established and step 116 is proceeded to.

Alternately, step 122 may determine that the purchaser 14 does not have the desired cookie (presumably because they have not yet established an account with the guarantor 16, but there can also be many other reasons, e.g., the purchaser 14 is using a new browser or different computer), or step 124 may determine that the account of the purchaser 14 lacks sufficient credit for the present transaction. For either of these cases, step 126 may try to open a new account or to raise the credit limit on an existing account for the purchaser 14 (e.g., by accessing a credit bureau database of valid potential purchasers 14; note, if desired, both of these operations can result in the guarantor 16 now creating a cookie for future use on the system used by the purchaser 14; in FIG. 2 the first leg 22 is shown with arrow heads point both directions to emphasize this). Step 128 determines whether the credit of the purchaser 14 is now established, so that step 116 can now be proceeded to; or, if the purchaser 14 is not credit worthy, to carry out step 130 which rejects the transaction.

In step 116 the guarantor 16 creates the voucher 20 which will be used to guarantee payment for the merchandise 12. Various methods may also be used for this, but the inventor's preferred one uses a key encryption scheme in which the guarantor 16 encrypts a value string into the voucher 20 by using a private key. (This concept is discussed more extensively below.)

In step 118 the guarantor 16 reformats the URL 50. The original URL address 52, which pointed to the guarantor 16, is now replaced with an address on the network 10 for the vendor 18 (as will be discussed further, below, this may be an address which was in the original URL request 56, or it may by a different address entirely). The specification of the merchandise 12 may also be appended (if it is not already) to the vendor 18 address, and this becomes the reformatted URL address 52, or it may be put (or left) in the reformatted URL request 56. For example, either of the following are examples of usable reformatted URLs 50:

vendor.com/images/snead.jpg ? price voucher vendor.com ?/images/snead.jpg price voucher but the former is more conventional in format. The text to the left of the leftmost question-mark ("?"; here there is only one, so it is the leftmost) is the new URL address 52, and the text to the right is the new URL request 56. Further, the text "voucher" which is now present in the URL request 56 represents the voucher 20, created in step 116.

In step 120 the guarantor 16 redirects the purchaser 14 to the new URL address 52 in the reformatted URL 50. Typically this will be an entirely conventional operation, using standard session redirection capabilities which the underlying network and software (e.g., server and browser) can handle entirely transparent to the purchaser 14.

As shown in FIG. 1, step 108, handling of the order by the vendor 18, is also a collection of sub-steps, all of which may also be handled by CGI script parsing and processing of the contents of the (now revised) URL 50 at the site of the vendor 18.

In step 132 the vendor 18 receives the order. This may also be a conventional operation, since the present URL address 52 now takes the purchaser 14 to the vendor 18. If the vendor 18 is not at this address, say because they are off-line or they no longer exist, the browser software of the purchaser 14 can handle the event of the invalid URL address 52 just as it would for any invalid conventional URL (presumably with a browser error message to the purchaser 14).

In step 134 the vendor 18 examines the "price" in the URL request 56 to see if it agrees with the price at which the vendor 18 expects to sell the merchandise 12. If not, the vendor 18 has two choices. They can reject the order, by simply not delivering the merchandise 12 and terminating the transaction, shown as step 136. Alternately, they can accept the tendered voucher 20 as payment in full. For example, such a price-inconsistency problem might arise due to a middle agent using a web page having out of date of URLs 50. However, if the vendor 18 is using the inventive payment method 100 for volume transactions in very low priced merchandise 12, they may simply want to ignore minor pricing inconsistencies (rather than disappoint purchasers 14 by rejecting orders), and instead address the root cause of the problem (e.g., by instructing the middle agent to replace out the of date web page). Finally, it should again be noted that price is not a required part of the URL request 56. If the price is omitted step 134 can also be omitted, and step 134 is optional even when the price is included.

In step 138 the vendor 18 examines the voucher 20 for validity. Various methods may be used for this also. However, as noted above, the inventor likes to use key encryption in the payment method 100. Accordingly, the vendor 18 now uses the public key of the guarantor 16 to decrypt the voucher 20. And the very act of successful decryption establishes the validity of the voucher 20, since only the guarantor 16, using their private key, could have encrypted something which is now decryptable in this manner. If the voucher 20 is determined to be invalid, the vendor 18 can simply now reject the order by not delivering the merchandise 12 and terminating the transaction, shown as step 140.

Note also that minor changes in step 116 and here in step 138 can add considerable security to the payment method 100. If in step 116 the guarantor 16 further encrypts the voucher 20 using the public key of the vendor 18, then only the vendor 18 using their private key can even start decryption of the voucher 20. Thus, all parties involved can be assured that no nefarious fourth party can copy the voucher 20 (say by monitoring network packet traffic) and decrypt it into a format which might be redeemable with the guarantor 16. This enhancement of the basic payment method 100 can provide great benefit to secure commercial transactions on large public networks like the Internet.

In step 142 the vendor 18 determines if the merchandise 12 is available. If not, the transaction can be handled appropriately. FIG. 1 shows one way to do this, by a step 144 sending a "Sorry, offer has expired" message as text, an image file, or a sound file to the purchaser 14 instead of the merchandise 12, followed by a step 146 terminating the transaction.

If all has proceeded well to this point, in step 148 the vendor 18 saves the now decrypted voucher 20 contents (e.g., a value string) for later use. In commercial contexts, this later use will presumably be to obtain redemption from the guarantor 16 of the value connoted by the contents of the voucher 20 (presumably at a discount, to compensate the guarantor 16 for their labors). But this need not always be the case. For example, the vendor 18 might simply want to accumulate zero-value vouchers 20 to calculate "hit counts" as part of a marketing test, or to track transaction routing (e.g., to determine which guarantors 16 end up handling the transactions if merchandise is offered to many purchasers 14 for free through various channels).

Finally, in step 150, the vendor 18 sends the merchandise 12 on to the purchaser 14, by releasing it for transfer over the network 10 in the conventional manner, as if it had been offered without condition all along.

A few summarizing comments are appropriate at this point. In the above scenario the guarantor 16 does not immediately debit the account of the purchaser 14, or immediately credit the account of the vendor 18. This is not necessarily the case, but it is desirable for simplicity and to engender the greatest degree of trust in the payment method 100 by all of the involved parties (and peripherally involved ones like governmental bodies, which have police and taxation roles even in cyber-commerce). For example, if the price for the merchandise 12 is obsolete and the vendor 18 does not want to consummate the transaction, or if for any reason the vendor 18 cannot deliver the merchandise 12, then the vendor 18 may simply not redeem the voucher 20 and the guarantor 16 will not debit the account of the purchaser 14 (notably also minimizing the need for rebates). This approach also meets the legal requirement, for some classes of transactions in some jurisdictions, that the tender of goods must precede or be essentially contemporaneous with the taking of payment therefor (e.g., under federal law in the United States it is inappropriate for vendors taking credit card telephone orders to debit a purchaser's account until the merchandise is actually shipped).

In commercial environments employing the payment method 100 the purchasers 14 may easily be individuals and firms. However, unlike most commercial environments today, the vendors 18 may also be individuals and firms. The inventive payment method 100 can be carried out with very low overhead costs, compared to qualifying and setting up individual accounts for vendors when conventional methods are used. Thus, only the guarantors 16, and perhaps credit bureau databases which they use for qualifying new purchasers 14, need typically be sizable or regulated institutions when using the payment method 100.

LOOKUP FUNCTION ENHANCEMENT

An enhancement of the payment method 100 allows the efficient lookup of a URL address 52 for a vendor 18 carrying the merchandise 12. Using this enhancement, an address for a vendor 18 can be omitted entirely from the URL 50 which the purchaser 14 initially follows to start the transaction. Instead an address for a vendor 18 can be looked up and supplied by the guarantor 16 prior to reformatting the URL 50 (step 118 in FIG. 1).

For this enhancement a database 28 of vendor 18 and merchandise 12 information is provided and made accessible to the guarantor 16, as shown in FIG. 2. The guarantor 16 then may use the specification of the merchandise 12 provided in the URL request 56 to look up an address for a vendor 18 which has previously been associated in the database 28 with that specification. There may be only one vendor 18 having only one address; or there may be only one vendor 18 having many addresses, with one presumably more suitable than the others for filling the specific order from the specific purchaser 14 (say due to being "closer" on the network 10 or better matched in communications capabilities); or there may be many vendors 18 having many addresses from which the guarantor 16 can randomly pick just one for the present transaction.

To facilitate this process, the merchandise 12 can be specified by nameplex (conventionally called Universal Resource Name, or URN). For example, <IMG SRC= "guarantor.com ? price URN">. When the guarantor 16 receives the URL request, containing the URN, they can look up the URN in a table in the database 28, choose one addresses, and proceed with their role in the rest of the payment method 100. Of course, URNs can be associated in the database 28 with multiple addresses and multiple vendors 18.

FIG. 1a shows minor additions which can be made to FIG. 1 at point 152, which can be used to implement the described lookup service. The purchaser 14 now sends a request to a guarantor 16 which is also acting as a lookup service (i.e., step 104 and step 112 can remain unchanged). However, the guarantor 16 now performs a lookup (step 154) in the database 28 to obtain a location of the merchandise 12. Step 156 tests to see if this was successful, if so the rest of the payment method 100 then resumes at step 114. But if an address where the merchandise 12 can be found is not in the database 28, step 158 terminates the transaction (or the guarantor 16 may resort to a searching a general lookup service on the network 10). This shows the benefit of combining a guarantor 16 based method of payment with the lookup operation. Since they are isomorphic, no further session legs are required, and no additional load is placed on the network 10. Of course, the payment method 100 may alternately be easily extended so that the purchaser 14 first uses general lookup service on the network 10 (e.g., Yahoo! on the Internet) to obtain an address for a vendor 18, and perhaps also that vendor's price, an essentially conventional operation on networks like the Internet. This variation is not shown, but could be inserted between step 102 and step 104 in FIG. 1. A disadvantage of this variation is that it adds an effective additional leg (splitting first leg 22 into two legs). Conversely this variation lets a purchaser 14 start with a URL 50 containing nothing but a specification of the merchandise 12—information for the vendor 14, the price, and the guarantor 16 can all come back in a reformatted URL 50 and via a redirection from the general lookup service.

Lookup based address substitution can also be used to implement "forwarding," by transparently substituting alternate vendors 18 even when identification of a vendor 18 is present in the initial version of the URL 50. An increasing problem on some networks 10, such as the Internet, is the need to maintain legacy addresses. When entities are bought out, partner with others, or simply transfer operations to more desirable addresses, they typically have to maintain validity of their old (legacy) addresses on the network for some time (notably tying up a lot of network addresses on some systems, such as the Internet's Domain Name System, DNS). Using the payment method 100 and lookup by the guarantor 16, a vendor 18 can simply have the guarantor 16 reroute transactions around obsolete addresses, so that the purchasers 14 are not disappointed and the network 10 is not unduly burdened.

USE WITH EXISTING METHODS

The payment method 100 may be used in concert with other security and network transaction schemes. For example, in the existing high-security Millicent system (T/M Digital Equipment Corporation of Maynard, Mass.) the broker (somewhat analogous to the guarantor 16) acts as both an issuer and redeemer of vendor-specific currency. Using the payment method 100, credit can be substituted for currency and the financial instrument (credit or currency) is not vendor-specific, a key weakness in Millicent. Similar to Millicent, the payment method 100 uses also URLs. Where the Millicent scheme uses the equivalent to the URL address 52, inventor prefers to use the URL request 56 to carry the information which is not specific to immediate routing. However, if the Millicent format of URLs and browsers and servers become common, there is no reason that the payment method 100 cannot also use this URL format, and even similar protocols and encryption techniques.

In addition to the above mentioned examples, various other modifications and alterations of the inventive payment method 100 may be made without departing from the invention. Accordingly, the above disclosure is not to be considered as limiting and the appended claims are to be interpreted as encompassing the true spirit and the entire scope of the invention.

INDUSTRIAL APPLICABILITY

The present payment method 100 is well suited for application in commercial transactions in content material on networks. The parties involved in such transactions will be purchasers 14, guarantors 16, vendors 18, and government, all acting in generally the traditional roles that those labels imply. As demonstrated by the phenomenal success and growth of bulletin board services (BBS) and particularly the Internet, there are potentially millions of purchasers 14, particularly if the ease of use and cost of the commodities sold can be kept low and their delivery kept reliable. The corresponding and exponentially increasing growth of markets within such communications facilitated venues similarly indicates a potential for millions of vendors 18, particularly if the costs to set up shop and to carry out business can be kept low. These are traditional market concepts. And as in traditional markets, there is a role for intermediaries and regulators, i.e., guarantors 16 and even government.

As discussed herein, the inventive payment method 100 requires very little of the purchasers 14. They need to open an account (which in view of the transaction amounts anticipated should require only a trivial amount of credit), and they need a conventional browser and network 10 access.

The payment method 100 requires even less of the vendors 18 than do most existing commercial environments. They need the merchandise 12, which presumably will often be their own work-product, and they need a server and network 10 access—or a service which supplies these. Thus, entry level costs or setting up shop is easy and inexpensive. Similarly the costs of doing business can be very low. The merchandise 12 is easily stockable and non perishable, and contact with the customers can be highly automated. The only major potential problem areas for the vendors 18 are dealing with intermediaries and regulators.

The payment method 100 fills the role of the intermediaries using the guarantors 16. Just like in traditional markets, they smooth the exchange of merchandise 12 and payment between the purchasers 14 and the vendors 18. They can extend credit to the purchasers 14, which is then taken to and accepted by the vendors 18. Or they can provide currency exchange, e.g., accepting credit or currency in Japanese yen for vouchers 20 which will ultimately be redeemed in German marks. They can potentially serve a number of vendors 18 and purchasers 14, issuing to the first blocks of credit exchanged money commensurate with the combined totality of the merchandise 12 which may then be bought from the second. The guarantors 16 can also fill the traditional role of market stabilization and promotion of trust. If a purchaser 14 asserts a valid grievance against a vendor 18, say because of shoddy or misrepresented merchandise 12, the guarantor 16 in the transaction has a vested interest in the ongoing vitality of the market. The guarantor 16 can then refund the price to purchaser 14 and withhold redemption to the vendor 16. Conversely, the guarantor 16 all along provides the vendor 18 with the guarantee that it will have no collection problems with the purchasers 14. The guarantor 16 can also additional provide services like merchandise 12 and vendor 18 address look up, and handling the bulk of burdens imposed by the regulators.

While some today still hope that regulation can be kept out of the growing frontier of network commerce, the unfortunate reality is that it probably cannot, and we had therefore best find ways which minimizes its impact. Examples of the roles of regulators include the police and taxation functions (if for no other justification than to pay for the policing). In the payment method 100 the guarantors 14 are the most effective point for control. They will be the fewest in number). They carry out the largest transactions (issuing and redeeming in bulk). And they are in a position of strength in the middle of all transactions. It follows that if they are directly policed the market runs well; and if they handle the record keeping and payment of taxes any related overhead is minimized, so the market also runs efficiently. The inventive payment method 100 is a marked improvement over other proposed schemes, where vendors and purchasers deal directly in every transaction, and where vendors and brokers mint a plethora of monies to sell to the purchasers. Such other systems lack a concentration point where the functions of regulation can be carried out effectively and efficiently.

For the above, and other, reasons, it is expected that the payment method 100 of the present invention will have widespread industrial applicability, and that the commercial utility of the present invention will be extensive and long lasting.

What is claimed is:

1. A method for transactions in merchandise which is content material on a network, the method comprising the steps of:
   (a) a purchaser following a URL on the network, said URL including a guarantor address for a guarantor and also a specification of the merchandise;
   (b) said guarantor receiving said URL and creating a voucher guaranteeing payment for purchase of said merchandise, adding said voucher to said URL, replacing said guarantor address in said URL with a vendor address for a vendor on the network, and redirecting said purchaser to said vendor on the network;
   (c) said vendor receiving said URL and releasing the merchandise over the network to said purchaser.

2. The method of claim 1, wherein said URL includes a URL address and a URL request which is separated from said URL address, and said URL address including said guarantor address and said URL request including said specification of the merchandise.

3. The method of claim 1, wherein at said step (a) said purchaser follows said URL by entering said URL into a web browser.

4. The method of claim 3, further comprising placing said URL into a HTML tagged portion of a web page on the network, and in said step (a) said purchaser selecting said HTML tagged portion to follow said URL.

5. The method of claim 1, further comprising said guarantor authorizing credit for said purchaser to purchase the merchandise, and terminating the method if said credit is inadequate.

6. The method of claim 5, wherein said authorizing includes checking an account cookie, which was previously issued to said purchaser, to establish whether said purchaser now has adequate said credit.

7. The method of claim 1, wherein said voucher represents a guarantee that said guarantor is willing to pay up to a pre-set limit set by said purchaser.

8. The method of claim 1, wherein said URL further includes a price for the merchandise and said voucher represents a guarantee that said guarantor is willing to pay said price on behalf of said purchaser for the merchandise.

9. The method of claim 1, further comprising in step (b) encrypting said voucher using a private key of said guarantor, so that decryption using a corresponding public key of said guarantor verifies that said guarantor created said voucher.

10. The method of claim 9, further comprising additionally encrypting said voucher using a public key of said vendor, so that said voucher is privacy protected until decryption occurs using a corresponding private key of said vendor.

11. The method of claim 1, further comprising in step (b) looking up said vendor address in a database of vendor information.

12. The method of claim 11, wherein said vendor address is looked up using said specification of the merchandise, to permit said purchaser to omit giving a proposed address for said vendor on the network, to permit looking up and substituting said vendor address when any said proposed address is found erroneous, and to permit looking up and substituting said vendor address when any said proposed address is considered non optimal for communications between said purchaser and said vendor on the network.

13. The method of claim 12, wherein said vendor address is looked up using a proposed address supplied in said URL, to permit forwarding to said vendor address when said proposed address is obsolete, and to permit substitution of said vendor address when said proposed address is considered non optimal for communications between said purchaser and said vendor on the network.

14. The method of claim 1, wherein said URL further includes a price being tendered for the merchandise, and further comprising in step (c) reviewing said price for acceptability, and terminating the method if said price is unacceptable.

15. The method of claim 1, further comprising in step (c) examining said voucher for validity, and terminating the method if said voucher is invalid.

16. The method of claim 15, wherein examining said voucher for validity includes verifying that said voucher was created by said guarantor.

17. The method of claim 15, wherein examining said voucher for validity includes verifying that said voucher contains adequate payment for the merchandise.

18. The method of claim 1, further comprising in step (c) determining whether the merchandise is available, and terminating the method if the merchandise is unavailable.

19. A system for transactions in merchandise available as content material on a network, the system comprising:
  (a) means for a purchaser to order the merchandise by following a URL on the network, where said URL includes a guarantor address for a guarantor and also a specification of the merchandise;
  (b) means for said guarantor to receive said URL, to create a voucher guaranteeing payment for said merchandise, to add said voucher to said URL, to replace said guarantor address in said URL with a vendor address for a vendor on the network, and to redirect said purchaser to said vendor on the network;
  (c) means for said vendor to receive said URL and to release the merchandise over the network to said purchaser.

20. The system of claim 19, wherein said URL includes a URL address and a URL request which is separated from said URL address, and said URL address includes said guarantor address and said URL request includes said specification of the merchandise.

21. The system of claim 20, wherein:
  said means for a purchaser is a computer running a browser program and said purchaser follows said URL by entering said URL into said browser program.

22. The system of claim 21, further comprising:
  a web page on the network in which said URL appears in a HTML tag and said purchaser selects said HTML tag portion to follow said URL.

23. The system of claim 20, further comprising:
  authorizing means for said guarantor to authorize credit for said purchaser to purchase the merchandise, and to terminate the transaction if said credit is inadequate.

24. The system of claim 23, wherein:
  said authorizing means includes an account cookie, which was previously issued to said purchaser, for establishing whether said purchaser now has adequate said credit.

25. The system of claim 20, wherein said voucher includes a guarantee that said guarantor is willing to pay up to a pre-set limit on behalf of said purchaser for the merchandise.

26. The system of claim 20, wherein said URL further includes a price for the merchandise and said voucher represents a guarantee that said guarantor is willing to pay said price on behalf of said purchaser for the merchandise.

27. The system of claim 20, wherein said voucher is encrypted using a private key of said guarantor, so that decryption using a corresponding public key of said guarantor verifies that said guarantor created said voucher.

28. The system of claim 27, wherein said voucher is further encrypted using a public key of said vendor, so that said voucher is privacy protected until decryption occurs using a corresponding private key of said vendor.

29. The system of claim 20, further comprising a database of vendor information, for looking up said vendor address.

30. The system of claim 29, wherein said database is accessible using said specification of the merchandise to look up said vendor address, to permit said purchaser to omit giving a proposed address for said vendor on the network, to permit look up and substitution of said vendor address when any said proposed address is found erroneous, and to permit look up and substitution of said vendor address when any said proposed address is considered non optimal for communications between said purchaser and said vendor on the network.

31. The system of claim 30, wherein said database is accessible using a proposed address supplied in said URL, to permit look up of said vendor address when said proposed address is obsolete, and to permit substitution of said vendor address when said proposed address is considered non optimal for communications between said purchaser and said vendor on the network.

32. The system of claim 20, wherein said URL further includes a price being tendered for the merchandise, to terminate the transaction if said price is unacceptable.

* * * * *